(12) United States Patent
Miyamoto et al.

(10) Patent No.: US 6,788,643 B2
(45) Date of Patent: *Sep. 7, 2004

(54) INFORMATION RECORDING METHOD AND APPARATUS

(75) Inventors: Harukazu Miyamoto, Kodaira (JP); Hiroyuki Minemura, Yokohama (JP); Yasushi Miyauchi, Akishima (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,503

(22) Filed: Jun. 5, 2003

(65) Prior Publication Data

US 2003/0193881 A1 Oct. 16, 2003

Related U.S. Application Data

(63) Continuation of application No. 10/189,428, filed on Jul. 8, 2002, now Pat. No. 6,580,673, which is a continuation of application No. 09/949,640, filed on Sep. 12, 2001, now Pat. No. 6,430,134, which is a continuation of application No. 09/712,969, filed on Nov. 16, 2000, now Pat. No. 6,307,825, which is a continuation of application No. 09/535,016, filed on Mar. 24, 2000, now Pat. No. 6,181,661, which is a continuation of application No. 09/350,282, filed on Jul. 9, 1999, now Pat. No. 6,104,692, which is a continuation of application No. 08/863,126, filed on May 27, 1997, now Pat. No. 5,953,299.

(30) Foreign Application Priority Data

| May 30, 1996 | (JP) | ............................................ | 08-136189 |
| Mar. 31, 1997 | (JP) | ............................................ | 09-079587 |

(51) Int. Cl.⁷ .............................. G11B 7/24; G11B 5/09
(52) U.S. Cl. ................................ 369/275.3; 369/275.2; 369/59.24; 369/59.12
(58) Field of Search ........................... 369/275.3, 275.2, 369/275.4, 59.24, 59.12, 59.25, 59.2, 47.23, 47.28, 59.1, 59.11

(56) References Cited

U.S. PATENT DOCUMENTS

| 4,761,775 | A | | 8/1988 | Murakami |
| 4,947,384 | A | | 8/1990 | Suzuki et al. |
| 5,040,165 | A | | 8/1991 | Tai et al. |
| 5,111,443 | A | | 5/1992 | Yokogawa |
| 5,195,073 | A | | 3/1993 | Kato et al. |
| 5,216,657 | A | | 6/1993 | Nishiuchi et al. |
| 5,233,593 | A | | 8/1993 | Ha |
| 5,343,455 | A | | 8/1994 | Takeuchi et al. |
| 5,343,456 | A | | 8/1994 | Maeda |
| 5,388,105 | A | | 2/1995 | Takagi et al. |
| 5,878,021 | A | * | 3/1999 | Miyauchi et al. ........ 369/59.25 |
| 6,005,839 | A | * | 12/1999 | Sako et al. ............. 369/275.3 |
| 6,031,814 | A | | 2/2000 | Nagata et al. |
| 6,115,340 | A | | 9/2000 | Van Den Enden et al. |

FOREIGN PATENT DOCUMENTS

| EP | 0 044 073 A1 | 1/1982 |
| EP | 0 317 344 A2 | 5/1989 |
| FR | 2 508 218 | 12/1982 |
| JP | 57-208647 | 12/1982 |
| JP | 63-229625 | 9/1988 |
| JP | 63-255846 | 10/1988 |
| JP | 1-133233 | 5/1989 |
| JP | 1-315032 | 12/1989 |
| JP | 2-94113 | 4/1990 |
| JP | 2-297724 | 12/1990 |

(List continued on next page.)

Primary Examiner—Tan Dinh
(74) Attorney, Agent, or Firm—Antonelli, Terry, Stout & Kraus, LLP (57) ABSTRACT

A rewritable recording medium having a synchronizing signal portion recorded with a synchronizing signal information and a data portion recorded with data information after the synchronizing signal portion. Each time the synchronizing signal information is rerecorded, a length of the synchronizing signal portion changes and a start position of the synchronizing signal portion changes.

2 Claims, 6 Drawing Sheets

FOREIGN PATENT DOCUMENTS

| | | |
|---|---|---|
| JP | 3-62320 | 3/1991 |
| JP | 3-150725 | 6/1991 |
| JP | 4-153919 | 5/1992 |
| JP | 4-212718 | 8/1992 |
| JP | 5-101389 | 4/1993 |
| JP | 5-166187 | 7/1993 |
| JP | 5-266490 | 10/1993 |
| JP | 6-12670 | 1/1994 |
| JP | 6-176361 | 6/1994 |
| JP | 0 718 831 A2 | 6/1996 |
| JP | 8-180410 | 7/1996 |
| JP | 9-219022 | 8/1997 |

\* cited by examiner

FIG.1A

CODED DATA    0010000100100001000100

FORM A    0011111000111110000111

FORM B    1100000111000001111000

INFORMATION RECORDING METHOD AND APPARATUS

CROSS REFERENCE TO RELATED APPLICATION

This is a continuation of U.S. application Ser. No. 10/189,428, filed Jul. 8, 2002, now U.S. Pat. No. 6,580,673, which is a continuation of U.S. application Ser. No. 09/949,640, filed Sep. 12, 2001, now U.S. Pat. No. 6,430,134, which is a continuation of U.S. application Ser. No. 09/712,969, filed Nov. 16, 2000, now U.S. Pat. No. 6,307,825, which is a continuation of U.S. application Ser. No. 09/535,016, filed Mar. 24, 2000, now U.S. Pat. No. 6,181,661, which is a continuation of U.S. application Ser. No. 09/350,282, filed Jul. 9, 1999, now U.S. Pat. No. 6,104,692, which is a continuation of U.S. application Ser. No. 08/863,126, filed May 27, 1997, now U.S. Pat. No. 5,953,299, the subject matter of which is incorporated by reference herein.

BACKGROUND OF THE INVENTION

The present invention relates to a so-called mark-edge recording in which marks are recorded in certain areas of a recording medium so that their physical property is made different from the other areas to thereby have information associated with both ends of each of the marks.

The present invention is particularly suited to a rewritable high-density information recording method capable of recording information to be repeatedly rewritable. The present invention is also suited to a so-called phase-changing type information recording method in which the physical property of the information recorded areas is made different from the other areas by the phase change of the recorded substance that is caused by changing the temperature of the information recording medium.

A conventional rewritable information recording method is disclosed in, for example, JP-A-63-22962. This method is an optical disk recording method for recording information by modulating the intensity of light.

Figure 6:
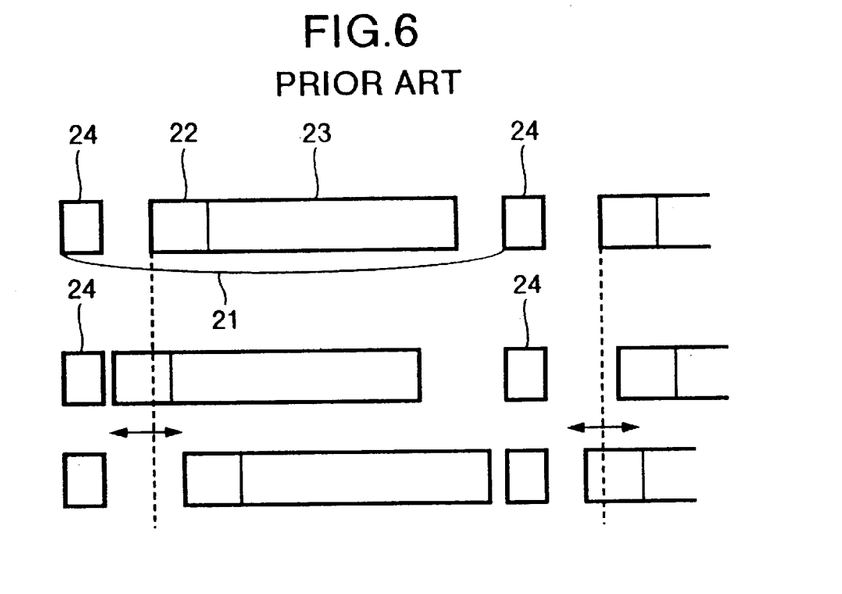
FIG. 6 is a plan view of for explaining one example of the prior art information recording method.

As shown in FIG. 6, information is recorded in a plurality of sectors 21, each of which has identification information 24 provided at its head in order to indicate the physical position of information. This identification information 24 is used as a reference to be followed by a synchronizing signal portion 22 and an information recorded portion 23 which are recorded as a record unit on the recording medium. At this time, the start position of the is record unit is randomly changed in its position at each time of rewriting, thereby increasing the possible number of times of repeated rewriting. In other words, the disk material at the same place within a sector is prevented as much as possible from being deteriorated by repeated rewriting, thereby raising the possible number of times of repeated writing.

Figure 7:
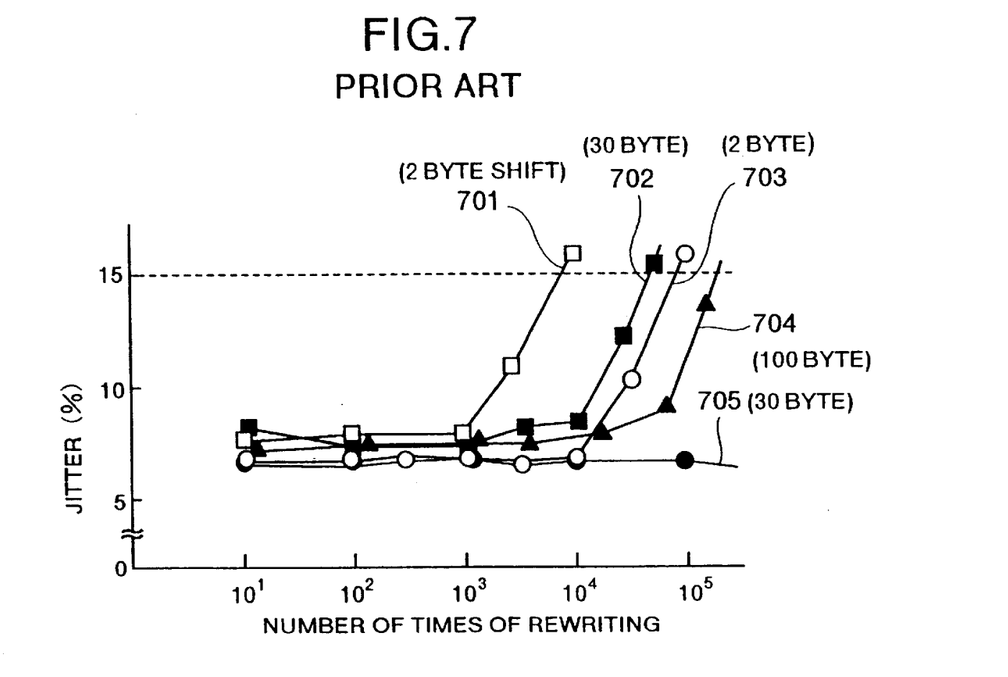
FIG. 7 is a graph showing the effect and drawbacks of the prior art information recording method.

FIG. 7 illustrates the relation between the number of times of rewriting and the jitter in the case where the same recording information is repeatedly recorded. Here, the jitter is defined as the standard deviation normalized by a reproduction detection window width, the standard deviation being of the time shift between a reproduction clock and a reproduced data after the same random data is EFM-modulated, recorded repeatedly and then reproduced.

In FIG. 7, a curve 701 was obtained when the start position of the recorded portion is shifted by 2 bytes in the mark-edge recording, a curve 702 when shifted by 30 bytes in the mark-edge recording, a curve 703 when shifted by 2 bytes in the mark-position recording, a curve 704 when shifted by 100 bytes in the mark-edge recording, and a curve 705 when shifted by 30 bytes in the mark-position recording. Here, the mark-position recording is the recording system in which information is recorded in association with the center position of the mark.

From FIG. 7, it will be seen that the increase of jitter after rewriting can be suppressed more, or the possible number of times of rewriting is increased as the amount of the shift of the start position of the recorded area is increased. Here, the minimum mark distance, in the mark-position recording in which data is associated with the center position of the mark, was selected to be 0.9 $\mu$m, and the minimum mark distance, in the mark-edge recording in which data is associated with both ends of the mark, was chosen to be 0.6 $\mu$m. In addition, the diameter of the recording and reproducing spot was 0.9 $\mu$m, and the recording medium used was a GeSbTe-based phase-change recording medium.

However, in the start-position shift system, and particularly in the mark-edge recording, the shift of the start position of the randomly recorded data must be increased to about 100 bytes in order to achieve a practical possible number of times of rewriting, as will be understood from FIG. 7, when the same information is repeatedly rewritten. Therefore, the utilization efficiency of sectors was greatly reduced. In addition, under this great positional shift, the beginning end or last end of recorded information will be superimposed upon other recorded portions. Since the recording characteristics of the beginning end or last end of recorded information are deteriorated probably due to the dissolution or flow of the recorded film, the effect of the change of the recording and production characteristics may be expanded over a wide range by repeated rewriting of these portions.

SUMMARY OF THE INVENTION

It is an object of the present invention to provide an information recording method capable of greatly increasing the possible number of times of repeated rewriting without reducing the recording efficiency in a rewritable high-density information recording method for repeatedly rewriting information so that the recorded information can be associated with both ends of a mark.

It is another object of the invention to provide an information recording apparatus capable of greatly increasing the possible number of times of repeated rewriting without reducing the recording efficiency in a rewritable high-density information recording method for repeatedly rewriting information so that the recorded information can be associated with both ends of a mark.

The present invention, in order to achieve the first object, provides the following aspects.

1) An information recording method is provided for repeatedly recording information on a recording medium in association with both ends of each of marks that are formed to be different in their physical property from other areas, wherein each time information is recorded, the marks and the spaces between the marks are substantially randomly inverted in their positions.

Thereby, when repetitive rewriting is made, the total number of times that the marks and spaces are recorded is uniform over all the medium, and therefore the medium is physically uniformly changed by repetitive recording. Accordingly, the possible number of times of repetitive rewriting can be greatly increased. This does not reduce the information recording efficiency at all.

(2) The substantially random inversion is made at each record unit.

Here, the record unit is a unit such as a sector that is actually recorded on the recording medium. In other words, any smaller ones than these record units are never rewritten as information on the recording medium. Of course, it is possible that after the record units are reproduced, only part of the reproduced information is modified and again recorded as in the read-modify-write process so that the minimum unit to be recorded can be apparently reduced. However, even in this case, the above-given record units are actually recorded on and reproduced from the medium. If this inversion occurred within the record unit, a complicated process would be necessary at the time of signal reproduction.

Thereby, the total number of times that marks are recorded in each record unit is uniform over the record unit. Since the reproduction process is generally made for each information record unit, the change of the medium due to repetitive recording of each record unit is uniform, and thus the possible number of times of repetitive rewriting can be increased.

(3) An information recording method is provided for repeatedly recording information on a recording medium in association with both ends of each of marks that are formed to be different in their physical property from other areas, wherein a synchronizing signal formed of a plurality of marks is provided at the head of an information recorded portion, and the number of marks of the synchronizing signal is changed each time information is rewritten so that the length of the synchronizing signal can be substantially randomly changed.

Thereby, since the region in which the synchronizing signal is recorded is used as an adjustment region, the position of the information recorded portion is substantially randomly changed. Therefore, when repetitive rewriting is made, the total number of times that the marks and spaces are repeatedly recorded is uniform over all the medium in each record unit. Consequently, the recording medium is uniformly changed in the physical property by the repetitive recording with the result that the possible number of times of repetitive rewriting can be greatly increased.

(4) An information recording method is provided for repeatedly recording information on a recording medium by forming recorded marks that are different in their physical property from other areas so that the information corresponds to both ends of each of the marks, wherein a synchronizing signal having a plurality of marks and spaces is provided at the head of the information recorded portion, and each time the information is rewritten, the number of the marks or the spaces of the synchronizing signal is changed so that the length of the synchronizing signal is substantially randomly changed, and the marks and the spaces between the marks are substantially randomly reversed in their positions.

Thereby, when repetitive rewriting is made, the total number of times that the marks and spaces are repeatedly recorded is more uniform over the medium, and hence the possible number of times of repetitive rewriting can be more increased.

(5) The length of a guard portion which has dummy data and is provided at the back end of the information recorded portion is changed depending upon the length of the synchronizing signal portion. Therefore, the total length of the record unit ranging from the head of the synchronizing signal portion to the back end of the guard or dummy data portion is substantially unchanged.

Thereby, since the total length of the record unit is substantially unchanged, the change of the beginning end and last end of information does not affect the information recorded portion at the center of the information. Therefore, the possible number of times of repetitive rewriting can be suppressed from being reduced by the effect of the change of the beginning end and back end of information.

(6) Each time the information is rewritten, the information recording start position is substantially randomly changed.

Thereby, when repetitive rewriting is made, the total number of times that the marks and spaces are repeatedly recorded can be made more uniform over the medium. Therefore, the possible number of times of repetitive rewriting can be more increased.

(7) An information recording method is featured in that the change of the information recording start position is smaller than that of the length of the synchronizing signal.

Thereby, the change of the beginning end and back end of information does not affect the central portion of information, or the information recorded portion irrespective of the change of the information recording start position. Consequently, the possible number of times of repetitive rewriting can be suppressed from being reduced by the effect of the change of the beginning end and back end of information. Therefore, the possible number of times of rewriting can be greatly increased.

The present invention, in order to achieve the second object, provides the following aspects.

(8) An information recording apparatus is provided for recording information on a recording medium by a structure having at least a record/reproduce head and a recording pulse generation circuit, further including at least a random signal generation circuit, a timing generation circuit, and any one of at least a polarity inverting circuit for inverting the recording pulse polarity in accordance with a random signal generated from the random signal generation circuit, and a synchronizing signal generation circuit having a function to change the length of the synchronizing signal.

Thus, since at least one of the polarity and timing of the recording pulse can be changed during recording, the total number of times that the marks and spaces are repeatedly recorded when repetitive rewriting is made can be made uniform over the medium. Consequently, the possible number of times of repetitive rewriting on the recording medium can be increased.

Here, the recording pulse is not any one of the pulses themselves of heat, light and magnetic field to be applied to the medium at the time recording on the medium. The actual pulse to be applied to the medium is formed after being converted by a recording pulse shaping circuit or the like into a multi-pulse train or the like depending on the characteristic of the medium, and then recorded.

(9) In addition, the recording pulse is passed through a synthesizing circuit after the generation of the synchronizing signal, coded data and dummy data, and then its polarity is inverted.

Thus, the polarity can be surely inverted without dependence on the encoding circuit and system for recording.

(10) The polarity of the synchronizing signal generated from the synchronizing signal generation circuit is at least changed in accordance with the above-mentioned random signal.

Thus, since the polarity of the recording pulse can be automatically inverted without additionally providing a polarity inverting circuit, the apparatus can be fabricated at low cost.

As described above, according to the present invention, there is provided an information recording method for recording information on the medium in a form of an array of recorded marks so that the "0"s or "1"s of binary information are made associated with both ends of each of the recorded marks, and featured in that if the same information is recorded a plurality of times, an array of recorded marks recorded on the medium according to the information includes an array in which the recorded marks and the spaces between the marks are inverted in their positions. Therefore, even though the same information is repeatedly recorded on the medium, the marks are not formed at a particular location, but can be uniformly formed over the medium by an energy beam, and thus the life of the recording medium can be expanded.

Moreover, the recording medium of the invention has formed along tracks a plurality of sectors each of which has a data region in which the recording data is recorded, a synchronizing signal region provided before the data region, and a dummy data region provided after the data region, the length of the synchronizing signal region included within each sector being not constant, the length of the range from the head of the synchronizing signal region to the back end of the dummy data region being constant.

Furthermore, a preferred embodiment of the medium has formed along tracks a plurality of sectors each of which has a data region in which the recording data is recorded, first and second regions provided before and after the data region, and an identification information portion provided before the first region, the length of the first region within each sector being not constant, the length of the range from the head of the first region to the back end of the second region being constant, the distance from the head of the first region to the back end of the identification information portion being not constant.

Thus, the recording medium is deteriorated uniformly by the irradiation of energy beam, and hence high reliability can be ensured.

BRIEF DESCRIPTION OF THE DRAWINGS

Other objects, features and advantages of the present invention will become apparent from reading of the following description of embodiments of the invention in conjunction with the accompanying drawings. Like reference numerals and symbols indicate like elements, parts or circuits in the drawings.

DESCRIPTION OF THE PREFERRED EMBODIMENTS

Embodiments of the invention will now be described in detail with reference to the drawings.

(Embodiment 1)

Figure 5:
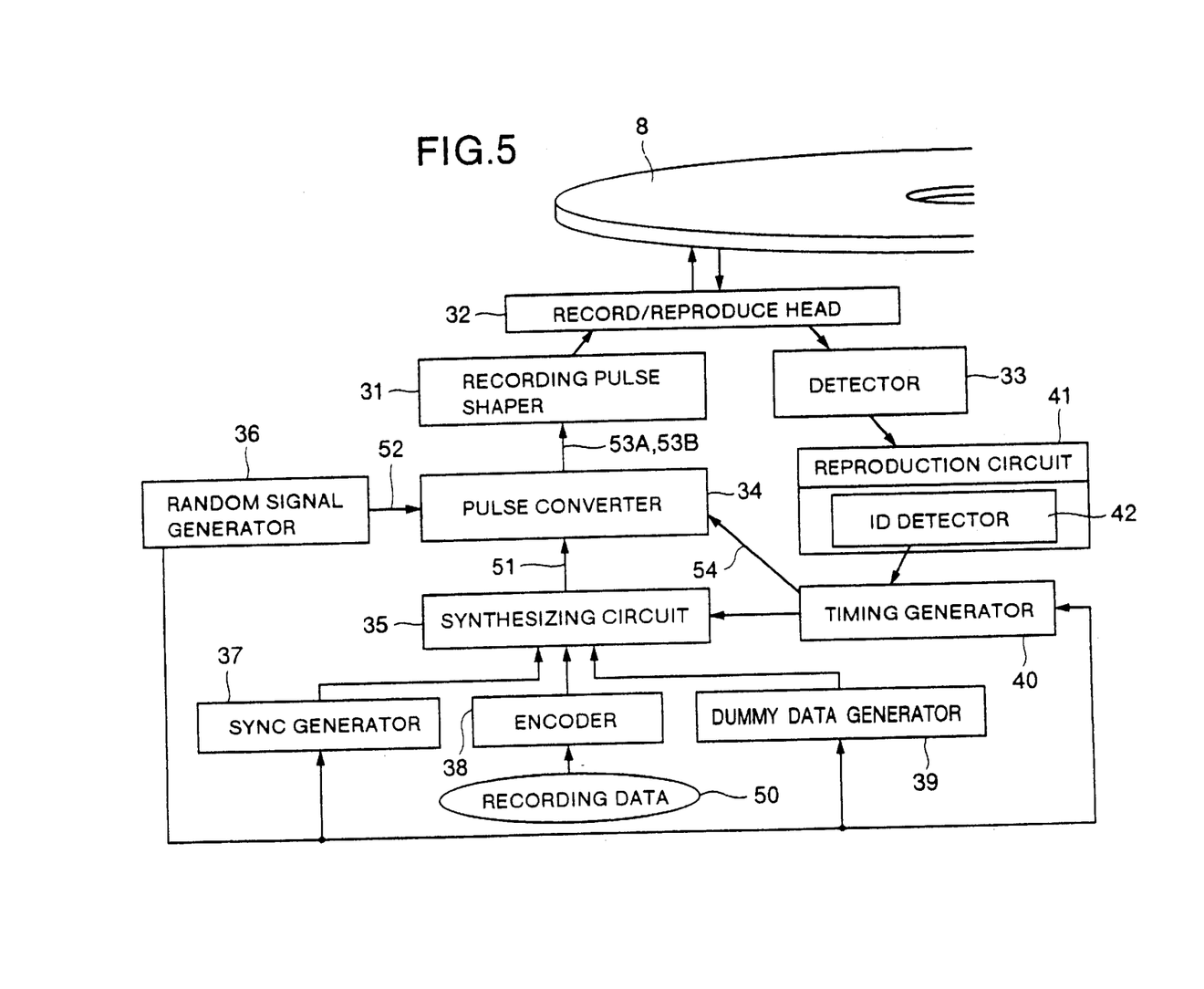
FIG. 5 is a block diagram of an information recording apparatus showing an embodiment of the present invention.

FIG. 5 shows an information recording apparatus of an embodiment of the invention. This apparatus includes a record/reproduce head 32 irradiating to a recording medium 8 an energy beam that is based on a recording pulse corresponding to coded recording data of binary information, to form recorded marks on the medium. The "1"s or "0"s of the binary information are recorded corresponding to the edges of the recorded marks. This apparatus also includes a pulse conversion circuit 34 for reversing the polarity of the recording pulse. The polarity-reversed recording pulse may be a pulse of which the leading edges and trailing edges correspond to either "1"s or "0"s of the binary information.

In this embodiment, a phase-change type optical recording medium (recording film: GeSbTe based material) is used as the recording medium. Therefore, the laser beam is modulated in its intensity, and irradiated on the recording medium to form recorded marks as amorphous portions within a crystal region of the medium.

Referring to FIG. 5, there are shown the record/reproduce head 32 which records and/or reproduces on the recording medium 8, a detection circuit 33 which detects the reproduced signal from the record/reproduce head 32, and a reproduction circuit 41 which reproduces information from the detected signal. The reproduction circuit 41 has at least an identification information detection circuit 42 which detects identification information on the medium. The identification information signal from the identification information detection circuit 42 is supplied to a timing generation circuit 40, which then generates various different timing signals for the recording operations.

The apparatus of this embodiment also includes at least a random signal generation circuit 36. The random signal generation circuit 36 may include a quasi-random sequence generator or may generate a random signal from the information asynchronous with the recording and reproduction operations, such as time or date. The apparatus of this embodiment further includes an encoding circuit 38 which encodes recording information (recording data) 50. This encoding circuit 38 is not necessarily provided within the apparatus depending on the recording code.

This embodiment employs (2, 11) RLL coding. A synthesizing circuit 35 provided in the apparatus combines the synchronizing signal from a synchronizing signal generation circuit 37, the coded data from the encoding circuit 38, and the dummy data from a dummy data generation circuit 39 in accordance with a timing signal from the timing signal generation circuit 40, to generate coded composite data 51 that is to be recorded as recorded units. The pulse conversion circuit 34 converts the coded composite data 51 into a recording pulse 53 with the polarity depending on the random signal 52 produced from the random signal generation circuit 36. In this case, the polarity inversion according to the random signal 52 is made for each record unit. The polarity inversion timing is controlled by a timing signal 54 from the timing generation circuit. The recording pulse thus generated is fed to a recording pulse shaping circuit 31 by which it is converted into a pulse form suitable for the record/reproduce head and the recording medium. The shaped pulse is supplied to the record/reproduce head 32 by which the energy beam according to this pulse is applied to the recording medium 8 to form recorded marks on the medium.

Figure 1A:
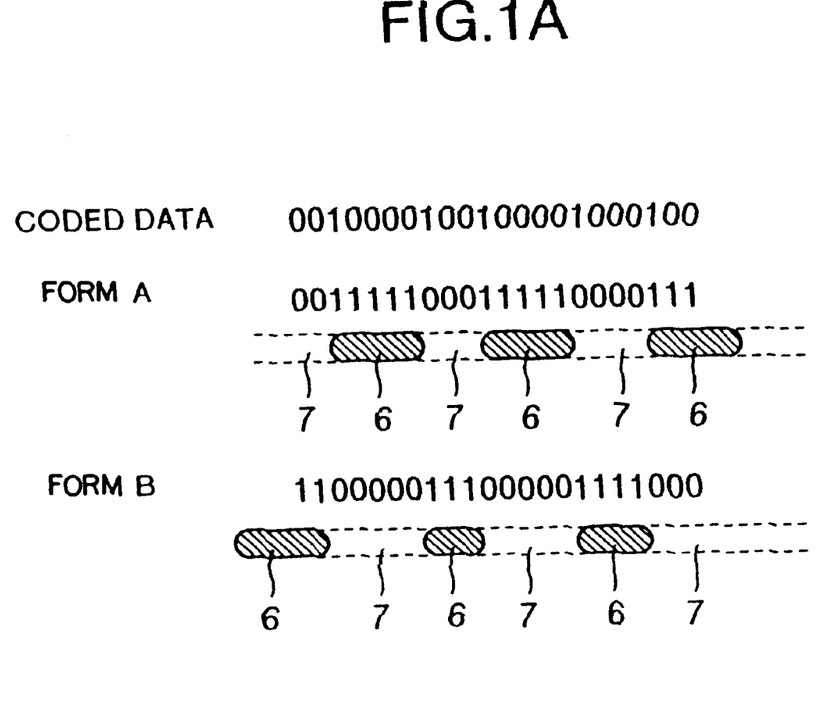
FIGS. 1A and 1B are a conceptional diagram and a pulse waveform diagram for explaining one embodiment of an information recording method of the present invention.
Figure 1B:
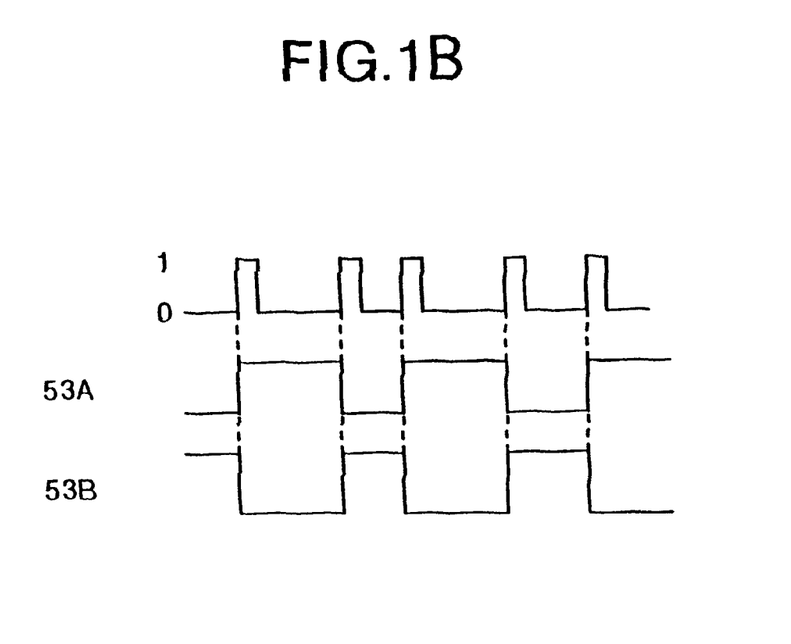

With reference to FIGS. 1A and 1B, a description will be made of the relation between the finally recorded marks and the coded data in this embodiment.

Referring to FIG. 1A, a coded data sequence "0010000100100001000100" is converted in NRZI-NRZ scheme into a recording pulse of a form A: "0011111000111110000111 or B: "1100000111000001111000", by the pulse conversion circuit 34.

The coded data sequence is, for example, a pulse 51 having high levels at "1"s as shown in FIG. 1B. The pulse conversion circuit converts this pulse 51 into a pulse 53A or a pulse 53B with the polarity opposite to the pulse 53A.

When the recording pulse 53 is shaped into a multi-pulse train by the recording pulse shaping circuit 31, and then recorded on the medium, a mark 6 associated with the "1"s of the recording pulse and a space 7 corresponding to the "0"s are formed on the recording medium as illustrated in FIG. 1A. In other words, the mark 6 and the space 7 between the marks 6 in the recording pulse A are respectively turned over in the pulse B to be the space 7 and the mark 6, associated with "0"s and "1"s. Thus, there is no problem in the reproduction even when the mark and space are turned over, respectively. This is because the reproduced data from A and B are the same coded data since the signal corresponding to both ends of the recorded mark 6, or the boundary between the mark 6 and the space 7 is detected at the time of reproduction.

Figure 9:
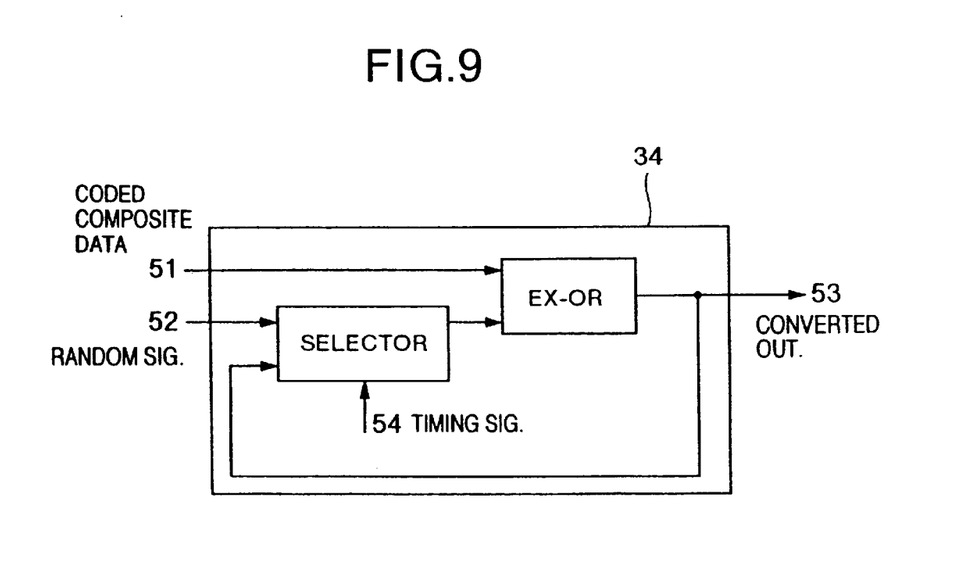
FIG. 9 is a circuit block diagram of part of the information recording apparatus according to the embodiment the present invention in conjunction with FIG. 5.

FIG. 9 shows one example of the pulse conversion circuit 34 in this embodiment. When a timing signal 54 is turned to be at a logical high level, the binary random signal 52 is selected as an initial value into one input of an exclusive logic sum circuit EX-OR to the other input of which the coded composite data 51 is applied. Then, when the timing signal 54 is turned to be at a logical low level, the exclusive logic sum circuit EX-OR produces the recording pulse signal 53A or 53B, or an exclusive logic sum of the output from the exclusive logic sum circuit EX-OR and the coded composite data including the coded data sequence 51.

In this embodiment, the beginning end of the record mark is randomly shifted in addition to the inversion of polarity. This random shift timing control is made by controlling the output timing of the synthesizing circuit 35 under the timing generation circuit 40. The timing generation circuit 40 randomly shifts the recording start timing in accordance with the signal from the random signal generation circuit 36.

Figure 8:
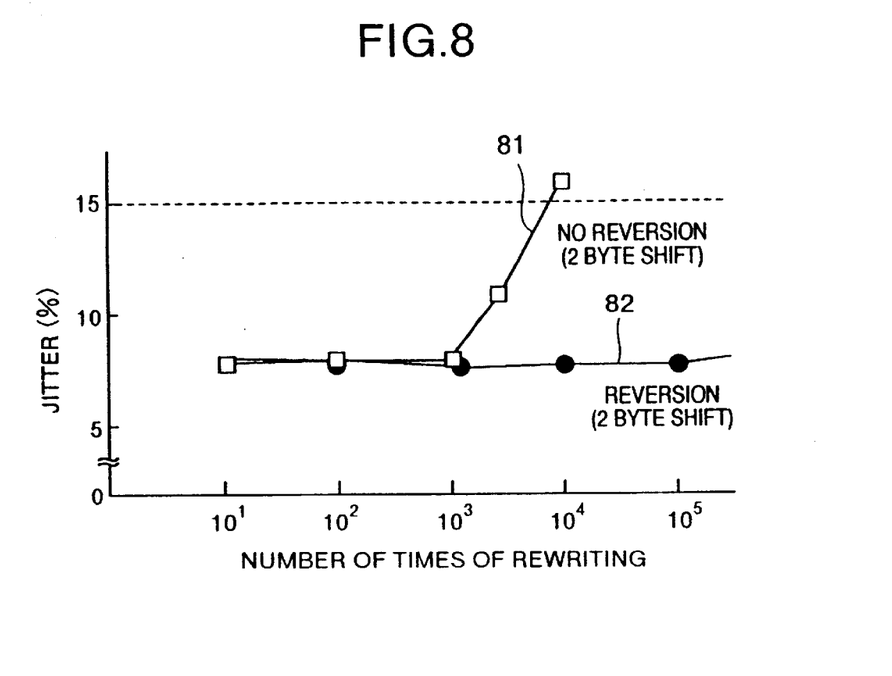
FIG. 8 is a graph showing the effect of the information recording method according to the present invention.

FIG. 8 shows jitter characteristics obtained when the same data is repeatedly recorded on one recording medium according to this embodiment. In FIG. 8, a curve 81 was obtained when the recording start position was shifted by two bytes, but when there was no polarity inversion. A curve 82 was obtained when the recording start position was similarly shifted by two bytes and when polarity inversion was made. In this case, the standard deviation of the time shift between the reproduction clock and the reproduced data after the same data was recorded repeatedly and then reproduced was normalized by the reproduction detection window width and used as the rate of jitter. From FIG. 8, it will be obvious that even when the recording start position is shifted by a small value in the order of two bytes, the possible number of times of rewriting can be increased much more by the additional polarity inversion in this embodiment than in the conventional apparatus (with no polarity inversion). In this experiment for the jitter characteristic, the minimum mark length was selected to be 0.6 $\mu$m, and the record/reproduce spot diameter was 0.9 $\mu$m.

According to this embodiment, as described above, the marks 6 having the first optical property and the spaces 7 having the second optical property are formed on the recording medium, and information associated with a binary code of "1"s or "0"s is recorded as an existence of boundary between a mark and a space. In this recording method, even if the same information is recorded a plurality of times, both cases in which the boundary corresponding to a particular binary code of information is changed from mark to space and changed from space to mark are controlled so as to appear in a plurality of repeated recording operations. Thus, the reliability in the recording medium can be increased.

(Embodiment 2)

Another embodiment of the invention will be described. The information recording apparatus of this embodiment is the same as in FIG. 5. In other words, this apparatus has the record/reproduce head 32 for recording and/or reproducing on the recording medium 8. The reproduced signal from the record/reproduce head 32 is detected by the detection circuit 33, and the detected signal is fed to the reproduction circuit 41 by which information is reproduced from the detected signal. The reproduction circuit 41 includes at least the identification information detection circuit 42 for detecting the identification information on the medium. The identification information signal from the identification information detection circuit 42 controls the timing generation circuit 40 to generate various different timing signals for the recording operations. The apparatus of this embodiment also has at least the random signal generation circuit 36. The random signal generation circuit 36 may include the quasi-random sequence generator, or may generate the random signal from the information asynchronous to the recording and reproduction operations, such as time or date.

The apparatus of this embodiment further has the encoding circuit 38 which encodes recording information (recording data) 50. This encoding circuit 38 is not necessarily provided within the apparatus depending on the recording code.

This embodiment employs (2, 11) RLL coding. The synthesizing circuit 35 provided in the apparatus combines the synchronizing signal from the synchronizing signal generation circuit 37, the coded data from the encoding circuit 38, and the dummy data from the dummy data generation circuit 39 in accordance with the timing signal from the timing signal generation circuit 40, to generate the coded composite data 51 that is to be recorded as recorded units. The synchronizing signal generation circuit changes the length of the synchronizing signal in accordance with the random signal generated from the random signal generation circuit 36. The dummy data generation circuit changes the length of the dummy data in accordance with the random signal generated from the random signal generation circuit 36. The pulse conversion circuit 34 converts the coded composite data 51 into the recording pulse 53 of a particular polarity. In other words, such polarity inversion as in the previous embodiment is not made. Thus, the generated pulse is converted into a pulse suitable for the actual record/reproduce head and recording medium by the recording pulse shaping circuit 31, and the record/reproduce head 32 applies the energy beam according to the shaped pulse on the recording medium 8 to form the recorded marks on the medium.

Figure 2:
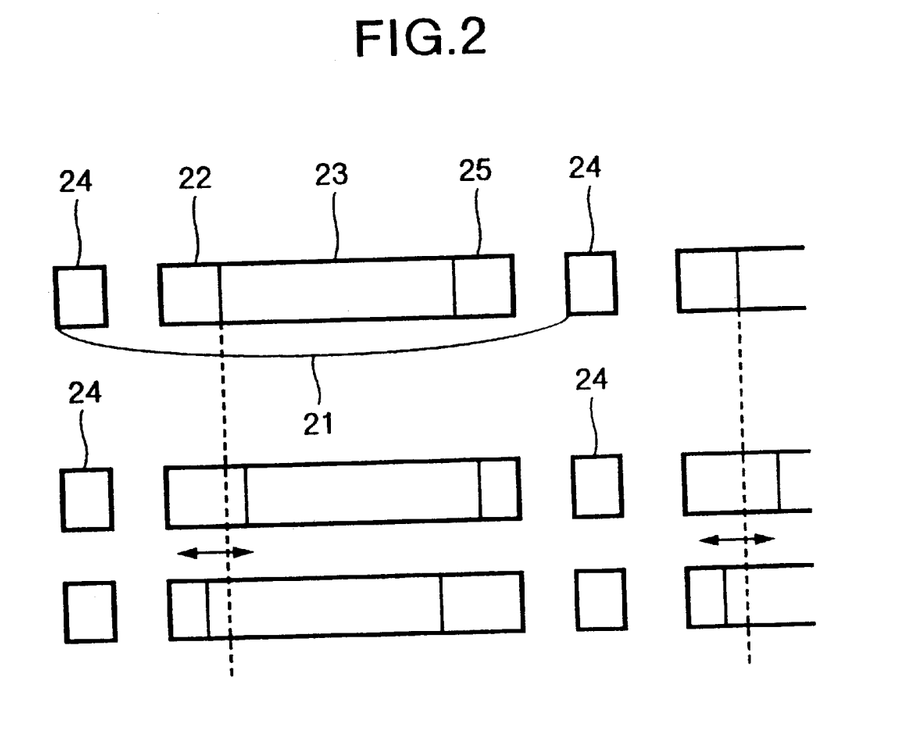
FIG. 2 is a plan view showing another embodiment of the information recording method of the present invention.

In this embodiment, the recording information is recorded to be arranged on the recording medium as illustrated in FIG. 2. In other words, the synchronizing signal portion 22 which may be considered as a guard portion is placed at a position separated about a certain distance from the identification information 24 that indicates the head of the sector 21, and the length of the synchronizing signal portion 22 is changed at each sector 21. The synchronizing signal portion 22 is followed by the information recorded portion 23 and the guard portion 25 in this order. The length of the synchronizing signal portion is changed in accordance with the random signal generated from the random signal generation circuit 36. The length of the dummy data is changed by the dummy data generation circuit 39 in accordance with the random signal generated from the random signal generation circuit 36. At this time, the distance from the head of the synchronizing signal to the back end of the guard portion is kept substantially constant.

Thus, even if the data in the information recorded portion is the same as in the previous recording, the information recorded portion 23 can be moved back and forth so that the position of the information recorded portion 23 on the medium is randomly changed. As a result, the total number of times of recording marks and spaces is kept uniform over all positions on the recording medium. Thus, the change of the recording medium due to the repeated recording can be averaged so that the possible number of times of repeated rewriting can be increased similarly to the prior art that is the mark position recording, although this embodiment is the mark-edge recording. In this case, since the recording start position and recording end position are respectively maintained to be substantially unchanged unlike the operation of the conventional apparatus. Therefore, even if the amount of shift of the information recorded portion 23 is selected to be about 30 to 100 bytes, the change of the recording and reproduction characteristic of the medium at around the recording start point and recording end point does not affect the recorded portion. Accordingly, the information recorded portion 23 can be easily shifted by a large amount, thus making it possible to increase the possible number of times of rewriting.

According to this embodiment, there is provided an information recording method in which a record mark is formed in the data region of the recording medium, and information is recorded in association with both ends of the record mark, as described above. In this method, first and second adjustment regions are provided at the front and back ends of the data region, and changed in their lengths so that the data region is shifted in its position. In addition, when the same information is recorded a plurality of times, the arrays of a plurality of record marks formed on the recording medium in association with the same information include opposite arrays in which the record marks and the spaces between the record marks are inverted as opposed to the former arrays.

(Embodiment 3)

Figure 3:
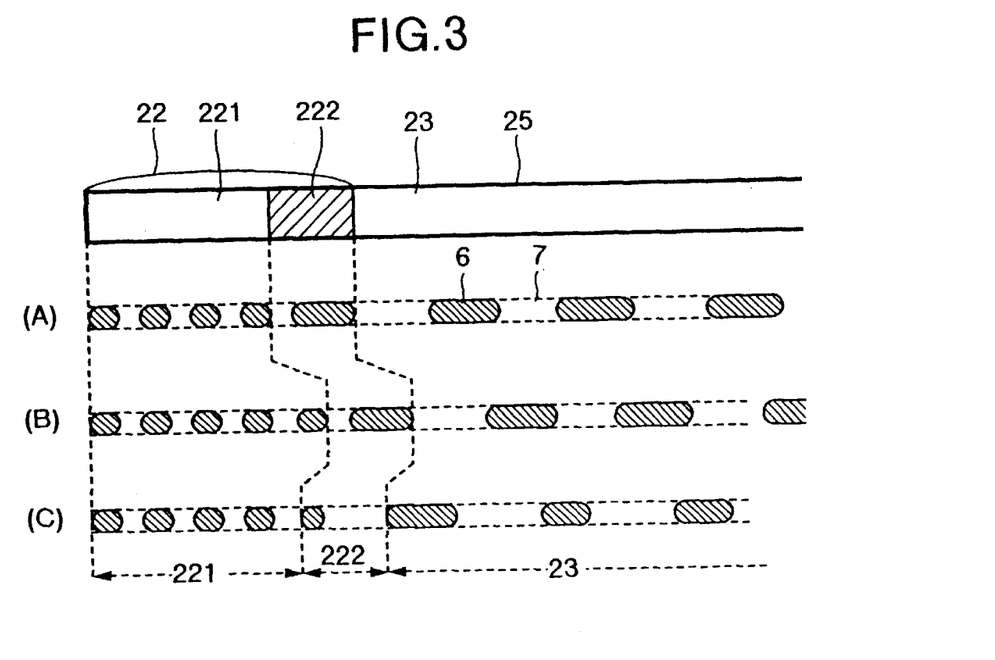
FIG. 3 is a plan view showing still another embodiment of the information recording method of the present invention.

This embodiment employs the same apparatus as Embodiment 2. The length of the synchronizing information is changed. In this case, the synchronizing information includes a first synchronizing information portion 221 (VFO) that has marks 6 and spaces 7 of the same length alternately and repeatedly arranged in turn, and the length of the synchronizing information portion 221 and its polarity at the end are changed. Specifically, the polarity is automatically changed depending on whether the total number of marks and spaces is even or odd. In addition, a second synchronizing information portion 222 (SYNC) is provided to follow the first synchronizing information portion 221. This second synchronizing information portion 222 has a fixed pattern, but its polarity is changed depending on the polarity of the final end of the first synchronizing information portion 221.

FIG. 3 shows examples (A), (B) of the first synchronizing information portion 221 in which the total number of marks and spaces is odd, and an example (C) of the first synchronizing information portion 221 in which the total number of marks and spaces is even.

Since this embodiment is capable of making polarity inversion without any polarity inverting circuit, the recording apparatus is simple in construction. In addition, since the information recorded portion 23 can be shifted in its position, the accumulated number of times that the marks and spaces are recorded is more uniform over the recording medium. Thus, the medium is more uniformly changed by repeated recording with the result that the possible number of times of repeated rewriting can be increased more than in Embodiment 1.

(Embodiment 4)

Figure 4:
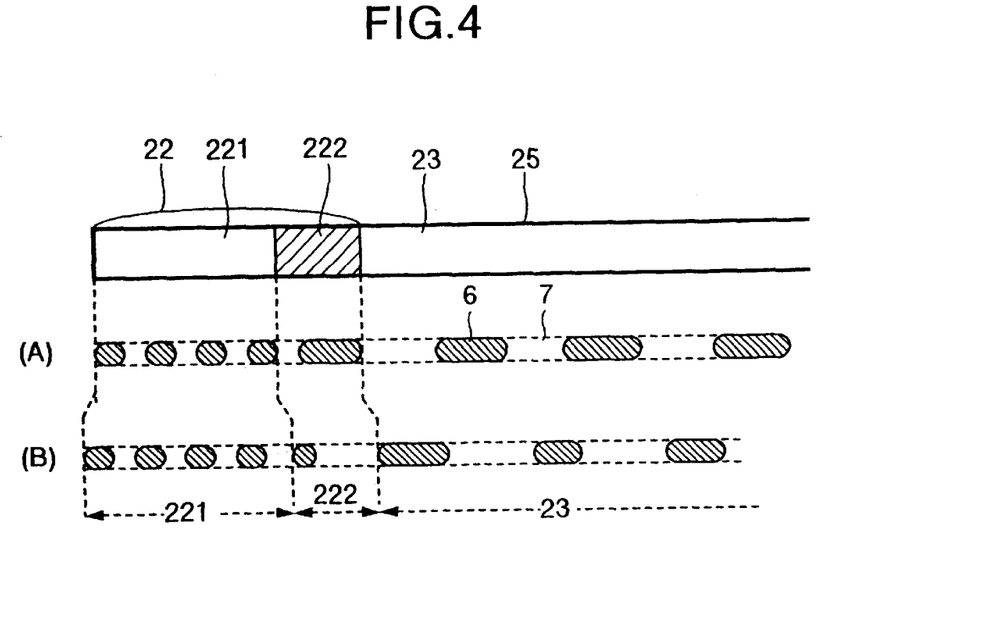
FIG. 4 is a plan view of showing a further embodiment of the information recording method of the present invention.

This embodiment employs the same apparatus as Embodiment 3. As shown in FIG. 4, the length of the first synchronizing information portion 221 is randomly changed, and also the recording start position of the first synchronizing information portion 221 is changed in accordance with the random signal. The amount of shift of the recording start position is substantially equal to the length of the marks (~¼ byte) within the first synchronizing information portion 221. Thus, since the total number of times at which the marks and spaces within the synchronizing information portion are recorded is uniform over all the medium, the possible number of times of repeated rewriting is increased more than in Embodiment 3. In addition, since the amount of shift of the recording start position is small enough, the recording start position can be considered not to be changed from the standpoint of the change of recording and reproduction characteristics at around the recording start position. Thus, there is no adverse effect of shift which appears in the prior art.

Since the marks and spaces are repeatedly recorded while they are turned over at each repetition, the total number of times by which the marks and spaces are repeatedly recorded, or rewritten is uniform over all the recording medium. Thus, the recording medium is uniformly changed by repetitive recording so that the possible number of times of repeated rewriting can be greatly increased. This does not reduce the information recording efficiency at all. In addition, since the position of the information recorded portion on the medium is randomly changed when the length of the synchronizing signal portion at the head of the information recorded portion is randomly changed, the total number of times by which the marks and spaces are repeatedly recorded is uniform over all the medium. Therefore, the recording medium is uniformly changed by repetitive recording, and hence the possible number of times of repetitive rewriting can be increased.

What is claimed is:

1. A rewritable recording medium, comprising:
    a synchronizing signal portion recorded with synchronizing signal information; and
    a data portion recorded with data information after the synchronizing signal portion;
    wherein each time the synchronizing signal information is rerecorded, a length of the synchronizing signal portion changes and a start position of the synchronizing signal portion changes.

2. A rewriteable recording medium according to claim 1, wherein the rewritable recording medium exhibits a first state with an energy beam at a first power level and a second state with an energy beam at a second power level higher than the first power level.

* * * * *